Sept. 8, 1959 R. M. SORENSEN 2,903,688
PORTABLE SIGNALS
Filed March 25, 1957
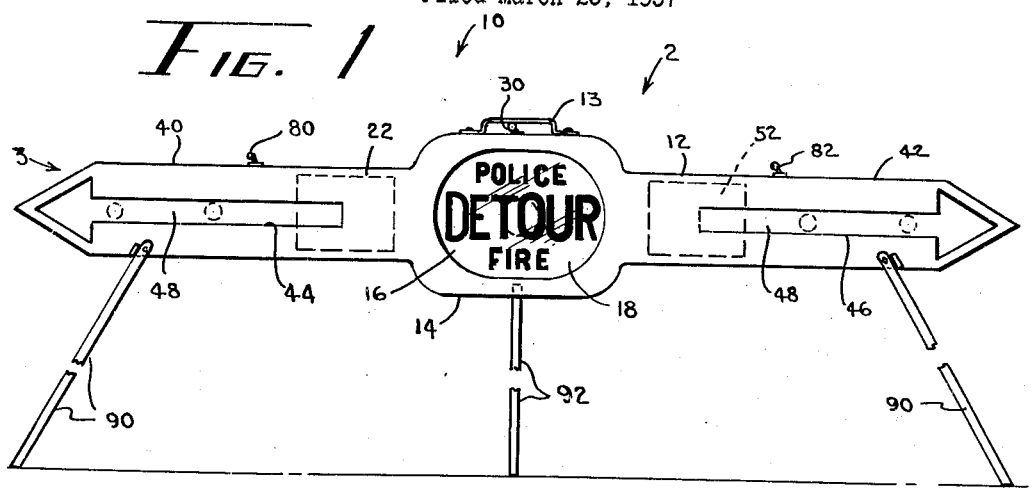
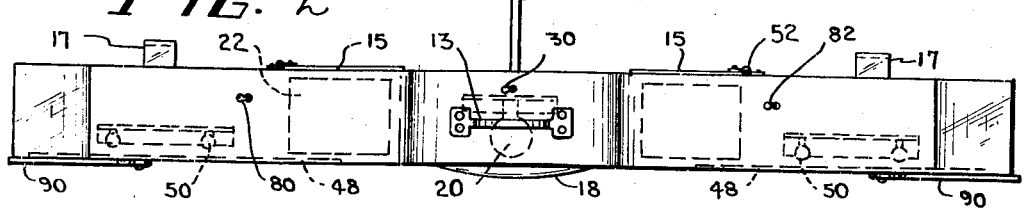
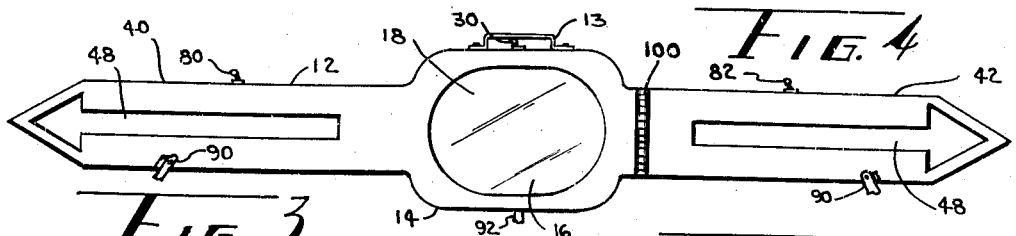
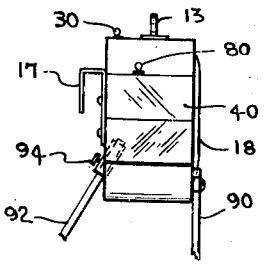
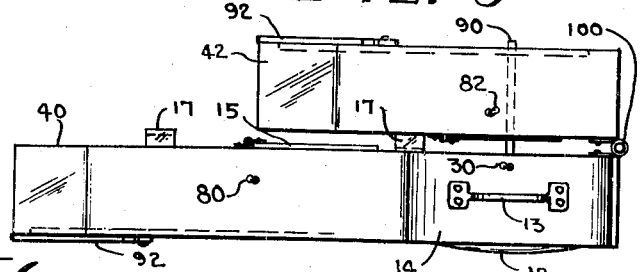
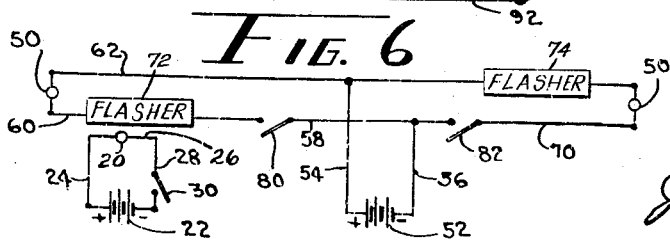
INVENTOR.
ROY M. SORENSEN
BY
John L. Woodward
ATTORNEY

2,903,688
PORTABLE SIGNALS

Roy M. Sorensen, Minneapolis, Minn.

Application March 25, 1957, Serial No. 648,224

3 Claims. (Cl. 340—366)

This invention relates to a portable signal which is designed for use primarily by fire and police departments for signaling approaching vehicles that there is danger ahead and that the vehicle must detour as indicated by the signal device.

It is an object of this invention to provide a portable signal which is electrically controlled and which is provided with its own source of electrical energy.

It is another object of this invention to provide in a portable directional detour electrically controlled signal means for indicating the direction in which approaching vehicles must travel.

It is another object of this invention to provide in a portable directional detour electrically controlled signal device of an electric light means which is continuously emitting light for slowing down approaching vehicles and other means, including electrical light means for indicating whether the approaching vehicles should turn to the right or left and means associated with the electrical light means for indicating the direction of travel of vehicles for varying light emission of these light means.

It is a further object of this invention to provide in a portable directional detour electrically controlled signal device of means for quickly setting up the device in the operational position.

With the foregoing and other objects in view which will appear as the description proceeds, the invention consists of novel construction and combination of parts hereinafter more fully described and pointed out in the appended claims, it being understood that changes may be made in the construction and arrangement of parts without departing from the spirit of the invention as claimed.

Figure 1 is front elevational view of the signal in operational position.

Figure 2 is plan view of the signal as shown in Figure 1.

Figure 3 is a left end view of the signal as shown in Figure 1 of the drawing.

Figure 4 is front elevational view of a modified form of the signal.

Figure 5 is plan view of the modified signal of Figure 4 shown in folded position.

Figure 6 discloses views of the electrical wiring diagrams employed by my signal device.

Referring to the drawing in detail 10 is the signal device which comprises an elongated metal casing 12 which consists of a central enlarged section 14 provided with an opening 16 in its front wall in which is mounted a lens 18 of desired color, such as red, yellow, etc. which carries the indicia "Police-Detour-Fire." Electric lamps 20 are positioned behind the lens 18 in the central section 14 of the casing 12. A battery 22 is carried in the casing 10 and is connected by electric conductors 24, 26, 28, etc. to the lamps 20. The lamps 20 are connected in parallel. A switch 30 controls the flow of electrical energy from the battery 22 to the lamps 20.

Elongated arrow-shaped sections 40 and 42 extend from the opposite sides or ends of the central section 14 of the casing 12. Arrow-shaped openings 44 and 46 are provided in the front walls of the sections 40 and 42 respectively. A red lens 48 is mounted in each of the openings 44 and 46 in the sections 40 and 42 respectively of the casing 12.

Electric lamps 50 are positioned in the sections 40 and 42 behind the red lenses 48. A battery 52 is carried in the section 42 of the casing 12 and is connected to the lamps 50 by electrical conductors 54, 56, 58, 60, 62, and 70. A flasher switch mechanism 74 is connected in conductor 62. A switch 80 controls the flow of electrical energy from the battery 52 to the lamps 50 and to the flasher switch 72 in section 40. Switch 82 controls the flow of electrical energy from battery 52 to the lamps 50 and to flasher switch 74 in section 42 of the casing 12.

Hinged legs 90 at each end of the casing 12 aid in supporting the signal 10 on the ground. Leg 92 supports the central portion of the casing 12. A socket 94 is mounted in a hole in the rear of the casing and extends outwardly therefrom. The upper end of the leg 92 can be received into the socket 94 and fastened to it by a set screw.

The signal 10 is designed to be used primarily by police and fire departments to detour vehicles around a disaster area, such as a fire in a building or an automobile accident. The signal may also be employed by highway departments and for any other purposes for detouring traffic. A signal 10 can be set up at each end of disaster block to detour traffic off the street in front of the block. The switch 30 is now moved to closed position to light lamps 20 in the central section 14, and these lights burn continuously and emit a steady light through the lens 18 which warns approaching vehicles. If it is desired to detour the vehicles to the left, see Figure 1, switch 80 is moved to closed position and the electric lamps 50 in section 40 emit light rays through the arrow-shaped red lens 48 which indicates to turn left. The flasher switch 72 intermittently operating the lamps 50 varies the emission of light rays from these lamps 50. At this time switch 82 is in open position so that the lamps 50 in section 42 of the casing 12 are off. If it is required that the approaching vehicles turn right, see Figure 1, switch 80 is moved to open position while switch 82 is moved to close the circuit to the lamps 50 and flashes switch 74 in the section 42 of casing 12. Now these lamps 50 intermittently emit light rays through the arrow-shaped red lens 48 in the section 42.

The legs 90 and 92 can be easily folded and demounted so that the signal device can be stored when not in use. The signal 10 can be carried about by a handle 13.

The rear wall of the casing 12 is provided with hinged doors 15 for access to the interior of the casing 12.

The rear of the casing 12 is provided with spaced apart hooks 17 to provide means for mounting the signal device 10 to a barricade if desired.

In Figures 4 and 5 a modified signal device is disclosed. The signal device is of the same construction as the device of Figure 1 except that section 42 is hinged to as at 100 on its rear side to the rear wall of section 14 of the casing 12. The front wall of section 42 is secured to the front wall of the central section 14 by means of hooks or the like. The hinged section 42, when not in use, can be folded to abut the rear walls of sections 14 and 40 of the casing 12.

The casing 12 may be made of any desired material such as metal, plastic, etc.

From the foregoing it will be seen that I have provided a signalling device which can be used by day and by night. The signal device is a self-contained type which can be quickly placed in operation.

Having thus described the invention, what is claimed is:

1. In a portable signal of the class described comprising in combination an elongated casing consisting of a substantially round-shaped central section provided with an opening, a lens mounting in the opening in the central section of the casing, an electric lamp in the central section for continuously illuminating the lens, a first source of electrical energy in the casing, first electrical conductor means connecting the first source of electrical energy to the electric lamps in the central section, a first switch means in the first electrical conductor means for controlling the flow of electrical energy from the first source of electrical energy to the electrical lamps in the central section, an arrow-shaped section formed at the opposite ends of the central section of the casing, the arrow-shaped sections being greater in length than the said central section, the front wall of each of the arrow-shaped sections of the casing provided with an arrow-shaped opening, a lens mounted in each of the arrow-shaped openings, electric lamp means positioned in each of the arrow-shaped sections behind the arrow-shaped lenses, a second source of electrical energy positioned in the casing, second electrical conductor means connecting the electrical lamp means in each of arrow-shaped sections with the second source of electrical energy, a second switch means for controlling the flow of electrical energy from the second source of energy to the electrical lamp means in one of the arrow-shaped sections of the casing, and a third switch means for controlling the flow of electrical energy from the second source of energy to the electrical lamp means in the other arrow-shaped section of the casing.

2. In a portable signal of the class described comprising in combination an elongated casing consisting of a central section provided with an opening, a lens mounting in the opening in the central section of the casing, electric lamp means in the central section for continuously illuminating the lens, a first source of electrical energy in the casing, first electrical conductor means connecting the first source of electrical energy to the electric lamp means in the central section, a first switch means in the first electrical conductor means for controlling the flow of electrical energy from the first source of electrical energy to the electrical lamp means in the central section, an arrow-shaped section formed at the opposite ends of the central section of the casing, the front wall of each of the arrow-shaped sections of the casing provided with an arrow-shaped opening, a lens mounted in each of the arrow-shaped openings, electric lamp means positioned in each of the arrow-shaped sections behind the arrow-shaped lenses, a second source of electrical energy positioned in the casing, second electical conductor means connecting the electrical lamp means in each of the arrow-shaped sections with the second source of electrical energy, a second switch means for controlling the flow of electrical energy from the second source of energy to the electrical lamp means in one of arrow-shaped sections of the casing, and a third switch means for controlling the flow of electrical energy from the second source of energy to the electrical lamp means in the other arrow-shaped section of the casing, first blinker means being provided in the electrical conductor means for the electric lamp means in one of the arrow-shaped sections of the casing for varying the light emission from the lamp means in said one arrow-shaped section and a second blinker means being provided in the electrical conductor means for the electrical lamp means in the other of said arrow-shaped sections of the casing, the second switch means controlling the flow of electrical energy from the second source of energy to the first blinker means, the third switch means controlling the flow of electrical energy from the second source of energy to the second blinker means.

3. In a directional detour signal comprising in combination a casing, a substantially round central section of the casing provided with an opening in its front wall, a lens mounted in the opening, an electric lamp means positioned in the central section behind its lens, a first source of electrical energy positioned in the casing, a first electrical conductor means connecting the first source of electrical energy with the electrical lamp means in the central section of the casing, a second section of the casing extending from one side of the central section provided with an opening in its front wall, the second section being longer than the central section, a lens mounted in the opening in the second section of the casing, electric lamp means positioned in the second section of the casing behind its lens, a third section of the casing extending from the other side of the central section provided with an opening in its front wall, the third section being longer than the central section, a lens mounted in the opening in the third section, electrical lamp means positioned in the third section of the casing behind its lens, a second source of energy positioned in the casing, electrical conductor means connecting the second source of energy with the electric lamp means in the second and third sections of the casing, a first blinker means connected in the second electrical conductor means for varying the light emission of the lamps in the said second section of the casing, a second blinker means connected in the second electrical conductor means for varying the light emission from the electrical lamp means in the third section of the casing, a second switch for controlling the flow of electrical energy from the second source of energy to the first blinker means and the lamp means in the said second section of the casing, a third switch means for controlling the flow of electrical energy from the second source of energy to the electrical lamp means in the third section of the casing and to the second blinker means.

References Cited in the file of this patent

UNITED STATES PATENTS

| | | |
|---|---|---|
| 1,459,104 | Johnson | June 19, 1923 |
| 1,738,401 | Simler | Dec. 3, 1929 |
| 1,896,578 | Furan | Feb. 7, 1933 |
| 2,165,562 | Mack et al. | July 11, 1939 |
| 2,540,341 | McNail | Feb. 6, 1951 |
| 2,564,145 | Beall et al. | Aug. 14, 1951 |
| 2,603,698 | Rieder | July 15, 1952 |
| 2,612,548 | Swanson | Sept. 30, 1952 |
| 2,706,809 | Hollins | Apr. 19, 1955 |